United States Patent [19]

Griswold et al.

[11] Patent Number: 5,299,853

[45] Date of Patent: Apr. 5, 1994

[54] VEHICLE SEAT ASSEMBLY WITH LINEAR ACTUATOR

[75] Inventors: Les Griswold, Ann Arbor; William H. Jones, Rochester; Marc D. Hewko, Canton; Joanne H. Cole, Ann Arbor, all of Mich.

[73] Assignee: Hoover Universal, Inc., Plymouth, Mich.

[21] Appl. No.: 12,344

[22] Filed: Feb. 2, 1993

[51] Int. Cl.5 .................. B60N 2/02; F16N 27/02
[52] U.S. Cl. .................. 297/362.12; 297/362.14; 297/361.1; 297/363; 74/89.15
[58] Field of Search ............ 297/362.12, 362.14, 297/361.1, 363; 74/89.15

[56] References Cited

U.S. PATENT DOCUMENTS

| | | | |
|---|---|---|---|
| 2,596,760 | 5/1952 | Bryant | 297/362.14 |
| 3,127,788 | 4/1964 | Martens . | |
| 3,383,135 | 5/1968 | Posh | 297/362.12 |
| 4,233,946 | 9/1980 | Kluting | 297/363 |
| 4,579,386 | 4/1986 | Rupp et al. | 297/362.12 |
| 4,589,301 | 5/1986 | Griner . | |
| 4,685,734 | 8/1987 | Brandoli | 297/362.12 |

Primary Examiner—Clifford D. Crowder
Assistant Examiner—Bibhu Mohanty
Attorney, Agent, or Firm—Harness, Dickey & Pierce

[57] ABSTRACT

A vehicle seat assembly with a linear actuator is disclosed in which the actuator is used to adjust the relative position of two relatively movable components of the seat assembly. The actuator includes a first part attached to one of the seat assembly components in the form of a lead screw with an external helical screw thread. A second part of the actuator is attached to the other seat component that is relatively movable and includes a housing containing a spin nut threaded onto the lead screw. The second part further includes means for axially capturing the spin nut to prevent the spin nut from rotating along the lead screw and means for selectively releasing the spin nut from its axial capture to permit rotation about the lead screw and thereby relative movement of the actuator second part relative to the first part. A cam is mounted to the second part to selectively engage and release the spin nut from its axial capture.

17 Claims, 8 Drawing Sheets

VEHICLE SEAT ASSEMBLY WITH LINEAR ACTUATOR

BACKGROUND AND SUMMARY OF THE INVENTION

The present invention relates to vehicle seat assemblies and in particular to vehicle seat assemblies having an linear actuator for use as a seat adjuster and/or a recliner.

Manually adjustable vehicle seat assemblies typically include an adjuster for adjusting the fore and aft position of seat assembly relative to the vehicle and a recliner for adjusting the inclination of the seat back. Such mechanisms must be capable of withstanding the high loads that may be applied to the seat assembly during a vehicle collision. More and more vehicle seat assemblies are being developed with the seat belts mounted directly on the seat assembly rather than being mounted to the vehicle structure. This increases the seat belt comfort because the belt anchors are moved with the seat assembly during adjustment rather than being fixed to the vehicle structure. However, with the seat belts mounted to the seat assembly, the forces applied to the recliner and adjuster mechanisms during a vehicle collision are significantly increased.

Accordingly, it is an object of the present invention to provide a recliner mechanism and a seat adjuster mechanism that are capable of withstanding seat belt loads.

It is a further object of the present invention to provide such devices which, when under high loading conditions, act to "lock up", making relative movement of seat components more difficult as opposed to failing under the high loads in a manner which increases the likelihood of seat component movement.

It is a feature of the present invention to provide a seat assembly with a seat adjuster mechanism or a recliner mechanism which relies upon friction to lock the movable seat components in place. When loaded, the mechanisms are designed to increase the normal force at the friction surfaces, thereby increasing the friction holding the seat components in place.

It is a further feature of the invention that the actuator of the present invention is infinitely variable in some embodiments to allow adjustment to any position desired.

The actuator includes a first part attached to one of the seat assembly components in the form of a lead screw with an external helical screw thread. A second part is attached to another seat component that is movable relative to the component attached to the first part. This second part includes an spin nut having a threaded bore that is threaded onto the lead screw and a housing for axially capturing the spin nut. The housing includes an end cap that is axially movable between a lock position in which the axial end walls of the spin nut are frictionally engaging the cap and the housing to prevent rotation of the nut along the lead screw and a release position in which the spin nut is freed for rotation. The end cap movement is controlled by a cam engaging an outer surface of the cap and an internal spring urging the end cap away from the housing.

Further objects, features and advantages of the invention will become apparent from a consideration of the following description and the appended claims when taken in connection with the accompanying drawings.

DETAILED DESCRIPTION OF THE INVENTION

Figure 1:
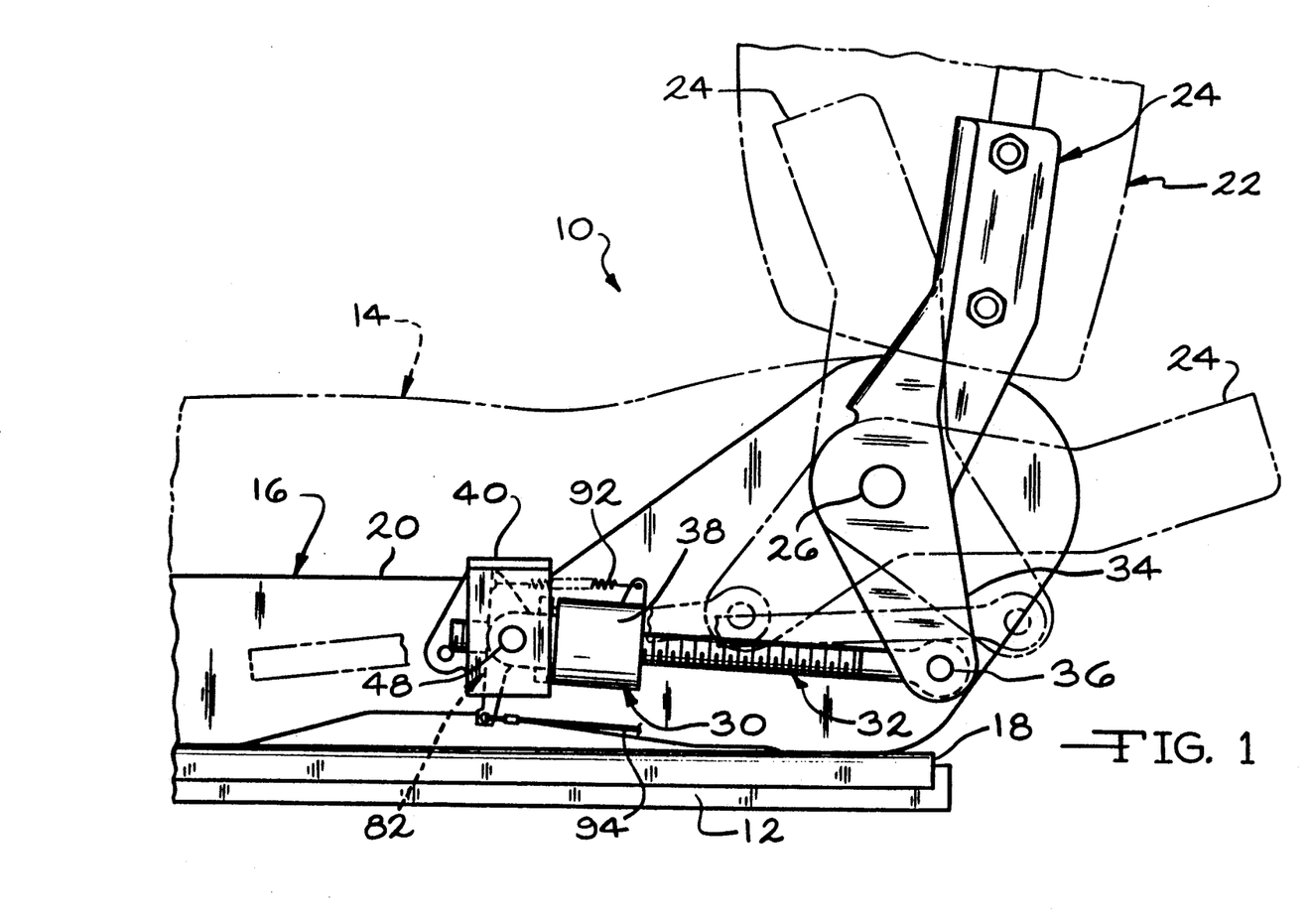
FIG. 1 is a fragmentary side elevational view of the structure of the seat assembly of the present invention showing the infinitely variable linear actuator used as a recliner mechanism.
Figure 2:
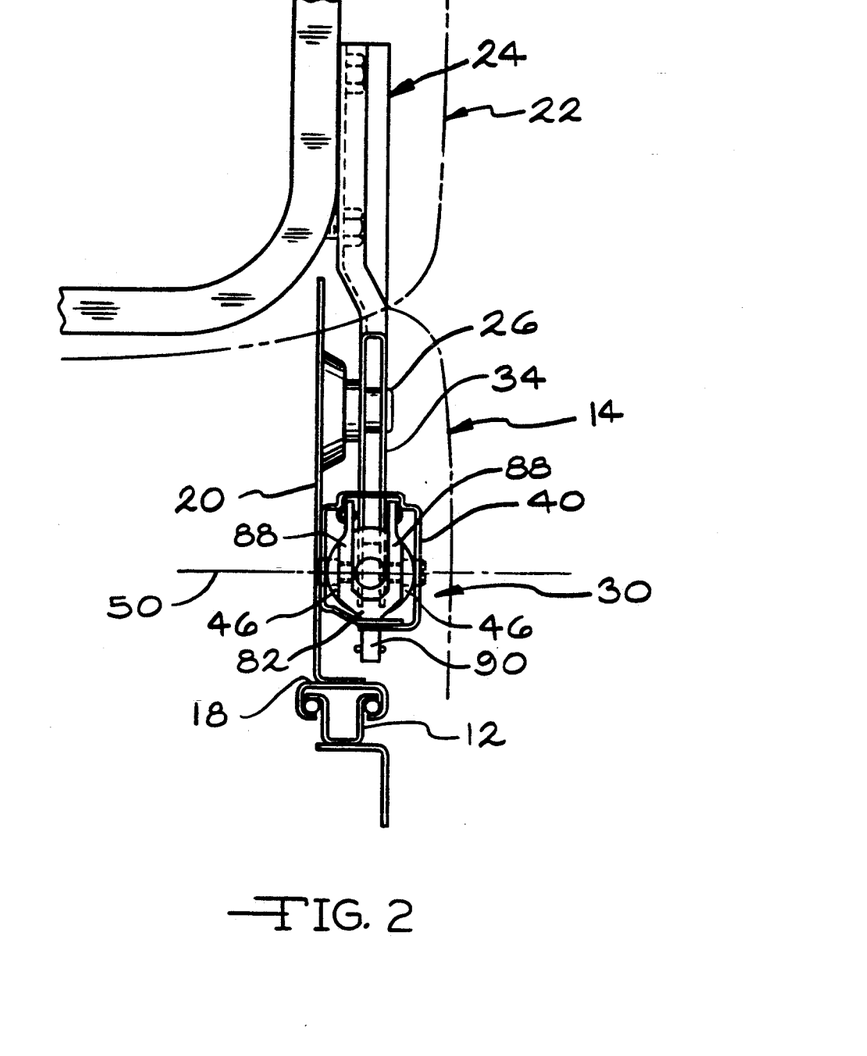
FIG. 2 is a front elevational view of the mechanism shown in FIG. 1.

The seat assembly of the present invention, having an infinitely variable linear actuator for a recliner mechanism is shown in FIG. 1 and designated generally as 10. Seat assembly 10 includes a base member 12 which is attachable to a vehicle floor. A seat member 14 is slidably mounted to the base member 12 and includes a seat frame 16 comprised of a slide rail 18, slidably mounted to the base member 12, and a riser 20. A seat back or back member 22, having a back frame 24, is pivotally mounted to the riser 20 at a pivot joint 26. The pivotal connection of the back frame to the riser enables the back frame and hence the back member to be rotated relative to the seat member as shown by the phantom line positions of the back frame 24. This enables the inclination of the back member 22 relative to the seat member 14 to be adjusted for the comfort of a seat occupant. An infinitely variable linear actuator 30 is used to hold or lock the back member in place relative to the seat member.

The actuator 30 includes a first part 32 pivotally attached at a pivot joint 36 to a recliner arm 34 of the back frame 24. The recliner arm extends downward from the pivot joint 26 that attaches the back frame to the riser. The first part 32 is allowed to pivot about a horizontal transverse axis but is not allowed to pivot about the axis 52 described below.

A second part 38 of the actuator is pivotally attached to the riser through a mounting bracket 40. The actuator 30 includes an internal mechanism, shown in FIGS. 3 and 4 which operates to lock the first part 32 relative to the second part 38, thus locking the back frame 24 to the seat frame 16, preventing relative motion therebetween. The second part 38 of the actuator includes a housing 42 having an end wall 43 at one end with a central aperture 45 therethrough. The opposite end 47 of the housing is open. An end cap 44 with a central aperture 49 is positioned in the open end so as to close the housing. A pair of mounting flanges 46 extend from the housing 42 and are coupled to the mounting bracket 40 at the pivot joint 48. This allows the second part 38 of the actuator to pivot relative to the seat frame 16 about a horizontal transverse axis 50.

The actuator 30 comprises a central linear axis 52 which passes through the points of attachment 36 and 48 of the actuator to the back frame 24 and seat frame 16 respectively. The attachment of a first part 32 to the recliner arm 34 of the seat frame comprises an eyelet 54 formed at one end of a shaft 56 which extends along axis 52. The eyelet 54 comprises a circular aperture 58 and its attachment to the recliner arm 34 is made by a circular pivot pin (not shown) being passed through the aperture 58 and a corresponding aperture in the recliner arm 34.

Figure 3:
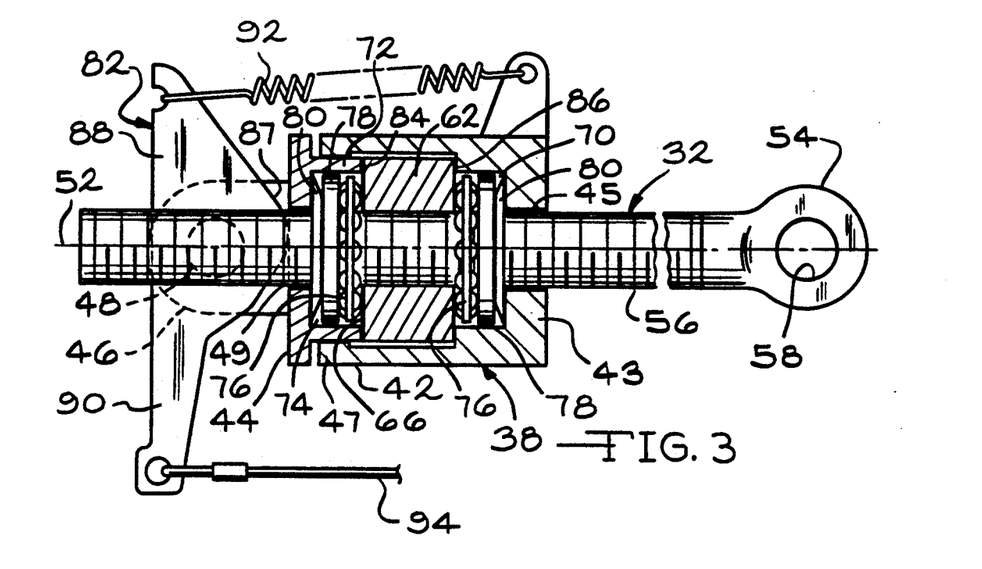
FIG. 3 is a sectional view of the actuator shown in a locked position.
Figure 4:
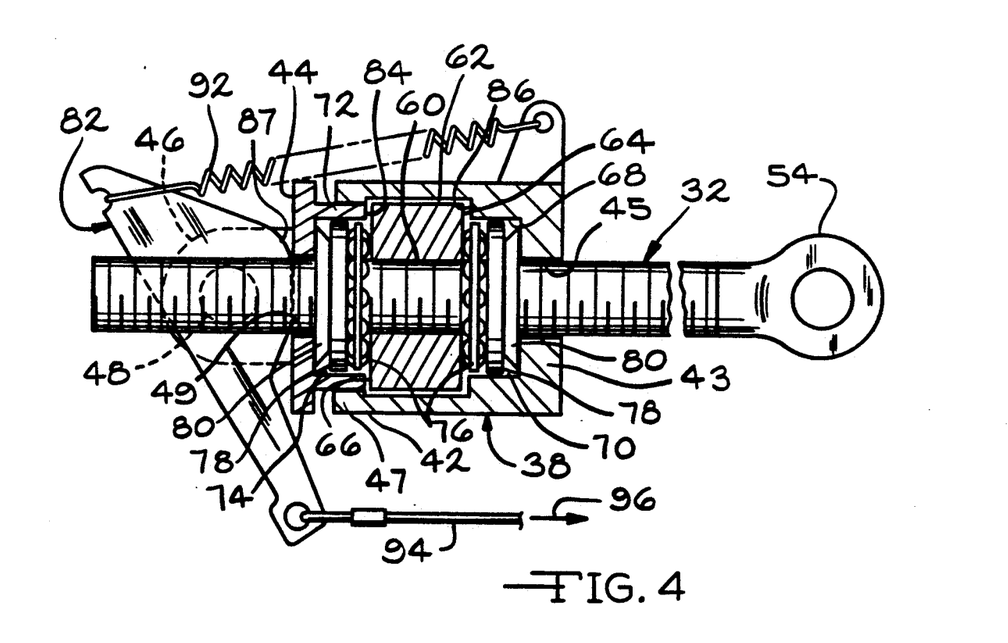
FIG. 4 is a sectional view of the actuator shown in a released position for seat back adjustment.

The shaft 56 is formed on its exterior surface with a threaded portion comprising a plurality of threads extending in the helical fashion around the outside of the shaft over a significant portion of its length as illustrated. The shaft 56 is operatively coupled with a complementary threaded portion 60 of an annular element 62 (FIGS. 3 and 4). The annular element 62 has its threaded portion 60 on its central bore which is concentric with the axis 52. In its preferred form, element 62 is of a circular outside diameter with spaced axial end walls or end faces 64 and 66 disposed in planes at a right angle to the axis 52.

The housing 42 includes a bore 68 at the closed end of the housing forming a recess 70 of a diameter less than that portion of the housing containing the annular element 62. The end cap 44 includes a cylindrical flange 72 extending into the housing 42 forming a recess 74 within the end cap that is similar to the recess 70.

Disposed within each recess is a circular array of bearings 76, an annular bearing race 78 and a yieldable resilient annular member 80. These members assist in positioning the annular element 62 within the housing 42. As illustrated, the yieldable resilient annular elements 80 are in the form of spring washers sometimes referred as Belleville washers.

Particular reference to FIG. 3, the end cap 44 is shown in a locked position in which it is forced into the housing 42 by a cam lever 82, described in greater detail below. In the locked position of the end cap, the yieldably resilient annular elements 80 are both compressed to the point that the end 84 of the cylindrical flange 72 contacts an outer annular portion of the axial end wall 66 of the annular element 62. Likewise, the shoulder 86 formed in the housing by smaller diameter bore 68, contacts an outer annular portion of the end wall 64 of the annular element 62. The friction between the two end walls 64 and 66 and the shoulder 86 and cylindrical flange 72 prevents rotation of the annular element 62 within the housing 42 about the axis 52. The mounting of the first part 32 to the recliner arm 34 prevents rotation of the first part 32 about the axis 52 while the mounting of the second part 38 to the seat frame 16 precludes rotation of the second part relative to the axis 52. Therefore, with the annular element 62 being prevented from rotating, the first and second parts of the actuator 30 are fixed in position relative to one another which in turn fixes the back frame 2 in position relative to the seat frame 16.

With reference to FIG. 4, the end cap 44 is shown in a release position in which it has been partially withdrawn from the open end of the housing 42. This has been permitted by rotation of the cam lever 82 decreasing the distance between pivot joint 48 and the cam surface 87 along the direction of axis 52. This enables the yieldably resilient annular elements 80 to move the end cap 44 axially toward the pivot joint 48. This disengages the cylindrical flange 72 from the annular element and also disengages the annular element from the shoulder 86 in the housing 42.

Each array of bearings comprises a retainer which serves to retain individual bearing balls. It is these bearing balls which provide rolling contact with the corresponding race 78 and the corresponding end wall 64 or 66 of the annular element 62. In this way, the bearing balls serve to facilitate free rotation of the element 66 between the walls which axially capture it when the mechanism is in an unlocked condition as shown in FIG. 4. In the unlocked condition, when axial forces are applied to the actuator 30, the threaded coupling between the shaft 56 and the annular element 62 enables the annular element 62 to rotate about the axis 52. This in turn causes translation of the first part 32 relative to the second part 38 thus changing the distance between the pivot joint 36 and the pivot joint 48.

The cam lever 82 is a forked lever having two legs 88 extending from a center portion 90. The cam lever is forked to provide a center clearance for the shaft 56 to extend therethrough. The two legs 88 are each pivotally mounted to the flanges 46 by the pivot joint 48. A pair of bias springs 92, each coupled to one of the legs 88 of the cam lever, acts to bias the cam lever to the locked position shown in FIG. 3. A control wire 94 is connected to the center portion 90, opposite the pivot joint 48 from the bias spring 92, and serves to limit the rotational travel of the cam lever in the direction of rotation urged by the springs 92.

The cam lever 82 has an irregular shaped cam surface 87. The axial distance between the pivot joint 48 and the cam surface varies depending upon the rotational position of the cam lever. In the locked position of the cam lever, the axial distance between the pivot joint 48 and the cam surface 87 is greater than when the cam lever is in the unlocked position shown in FIG. 4. As a result, in the locked position, the end cap 44 is positioned further from the pivot joint 48 than in the unlatched position shown in FIG. 4.

A hand operated control lever (not shown) is coupled to the control wire 94 in a conventional manner to pull on the wire 94 in the direction of the arrow 96 of FIG. 4 to unlock the actuator 30. When the wire 94 is pulled, the cam lever is rotated to the release position, enabling the annular element 62 to spin. This enables adjustment of the back frame 24 relative to the seat frame. Upon release of the lever, the bias springs 92 will automatically return the actuator to the locked position. During a vehicle collision, if forces are applied to the seat back in a direction to rotate the seat back forward, the shaft 56 will be placed in tension causing the annular element 62 to be forced against the shoulder 86 with a greater force than applied by the end cap and cam. This increases the frictional force at that interface and thereby increases the resistance to rotation of the annular element 62 tending to "lock-up" the actuator during a period of high loading. If the seat back is loaded in the opposite direction, placing the shaft 56 in compression, the annular element 62 will be forced against the cylindrical flange 72 thus increasing the friction at that interface and increasing the resistance to rotation of the annular element.

The actuator can embody an inertia locking feature by virtue of the construction which has already been described. This would be particularly useful in the event that inertia loads are encountered when the end cap 44 is in a condition other than a fully locked condition. For example, if the mechanism is not fully locked and the vehicle is involved in a sudden deceleration, such as panic braking or a collision, the application of inertia forces arising out of the deceleration can be effective to cause the element 62 to be urged axially within its axial capture so that one of its end walls forcefully abuts the corresponding axial confining surface 84 or 86, depending on the direction of inertia forces. Hence, such inertia forces can be effective to lock element 62 against rotation and thereby resist collapse or extension of the actuator which might otherwise occur. Such inertia locking capability is created by a suitable selection of the yieldability of the annular elements 80 since they must yield to permit the inertia locking action to take place.

Figure 5:
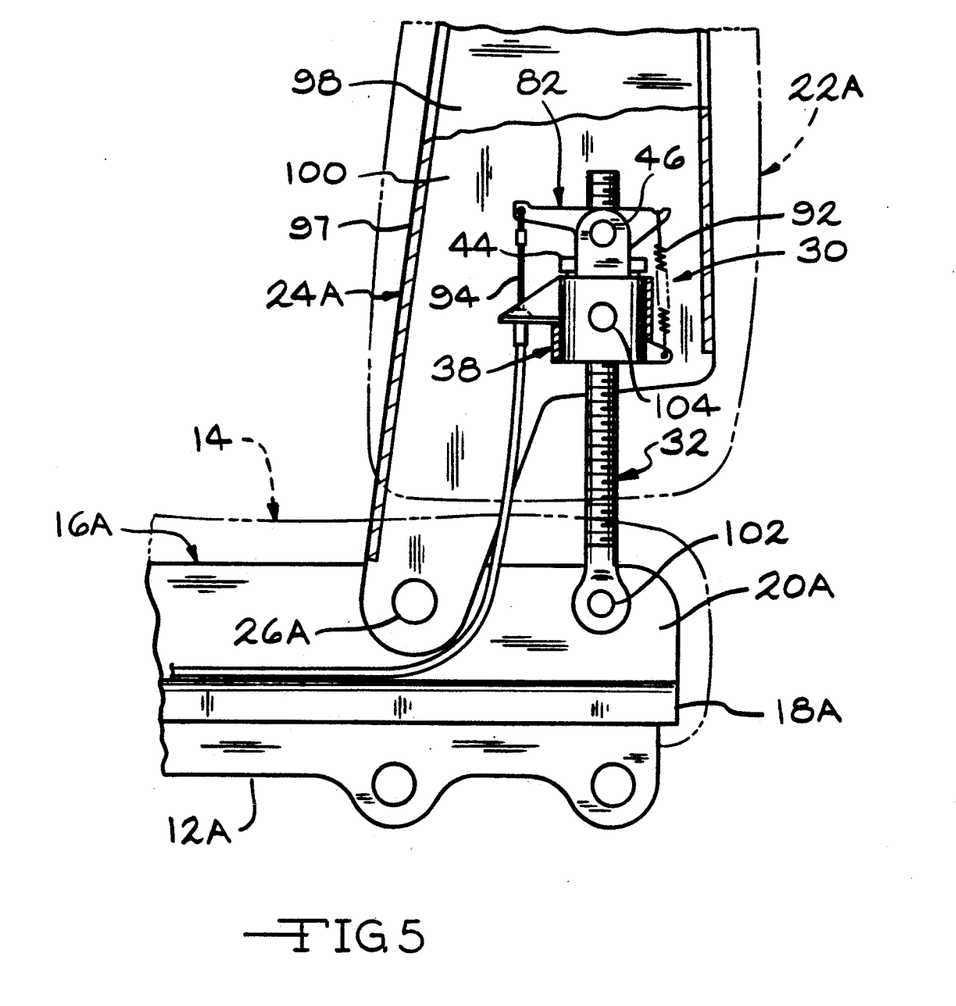
FIG. 5 is a fragmentary elevational view of the seat structure showing an alternative embodiment of the recliner mechanism.

The actuator 30 is shown in a alternative installation for use as a recliner mechanism. The actuator 30 is in all respects identical to the actuator shown and described in FIGS. 1 through 4. It is the seat assembly itself that differs between the embodiment shown in FIGS. 1 through 4 and the embodiment shown in FIG. 5. Identical elements are given the same reference numerals while elements that have been modified are given the same reference numeral with the lower case "a" as a suffix. The back frame 24a is in the form of a closed section beam 97 with the actuator 30 mounted within the beam. The beam 97 is used when a shoulder belt is mounted to the seat back to provide added strength to accommodate the belt loads. The two flanges 46 of the actuator are pivotally mounted to the side walls 98 and 100 of the beam 24a. The actuator 30 is mounted to the seat assembly with the first part 32 pivotally mounted to the seat frame 16a at the pivot joint 102 while the second part 38 of the actuator is mounted to the back frame 24a through the pivot joint 104.

Figure 6:
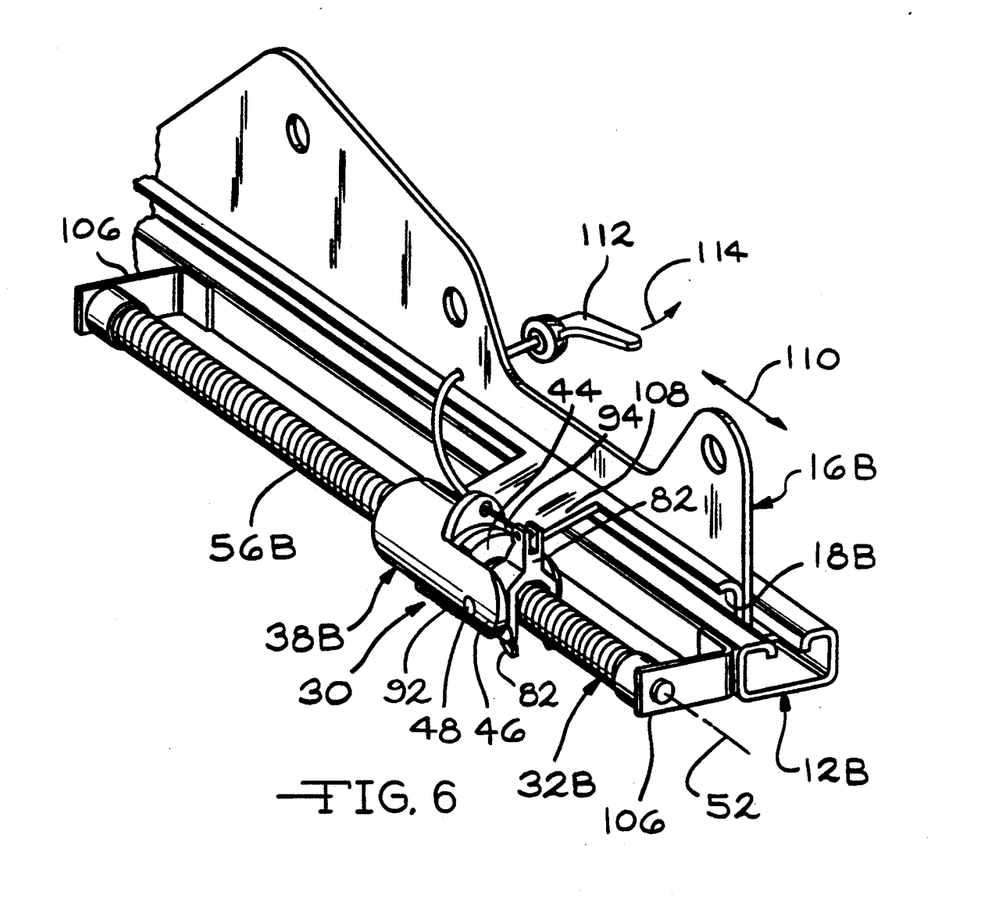
FIG. 6 is a perspective view of the seat structure showing the actuator used as a seat adjuster.

With reference to FIG. 6, the infinitely variable actuator 30 is shown in use as a seat adjuster to lock the seat in the fore and aft adjusted position. Components of the seat assembly in FIG. 6 identical to those in FIGS. 1-4 are given the same reference numerals while those components that are similar to that disclosed in FIGS. 1-4 are given the same reference numeral with the suffix "b". In most respects, the actuator 30 of FIG. 6 is identical to the actuator 30 in FIGS. 1-4. The first part of the actuator 32b is a screw shaft 56b that is mounted at its two axial ends to the base member 12b through mounting flanges 106 extending laterally from the base member 12b. Shaft 56b is not rotatable about the axis 52. The second part 36b of the actuator is mounted to the seat frame 16b through a mounting flange 108. As in the previous embodiments, the first part 32b is fixed from rotating about the axis 52.

The seat frame 16b is slidably mounted to the base member 12b for fore and aft sliding motion in the direction of arrow 110. With the base part 12b fixed to a vehicle floor pan, movement of the seat frame 16b accomplishes fore and aft adjustment of the seat assembly within the motor vehicle. With the actuator 30 in a locked condition, the annular element 62 within the second part 38b is fixed from rotating and thereby prevents movement of the seat frame 16b relative to the base part 12b. When the wire 94 is pulled by rotation of the release lever 112 in the direction of arrow 114, the cam lever 82 is rotated about the pivot 48, releasing the frictional capture of the annular element 62 allowing the element to rotate and the seat frame 16b to move relative to the base part 12b.

The seat assembly would typically include a second actuator 30 mounted to a base frame 12b and seat frame 16b at the opposite lateral side of the seat assembly. A second wire 94 can be coupled to the actuator 30 at the opposite side of the seat assembly and actuated by the release lever 112 for simultaneous release of the two actuators 30.

An alternative embodiment of the actuator, is shown in FIGS. 7–10 and designated generally as actuator 30c. As before, identical components are given the same reference numeral while modified components are given the same numeral with the suffix "c". The operation of actuator 30c is the same as actuator 30 described in detail above. Actuator 30c includes an additional secondary locking mechanism to prevent rotation of the annular element 62c. The secondary locking mechanism requires that the actuator be used positioned with the axis 52 oriented vertically.

Figure 9:
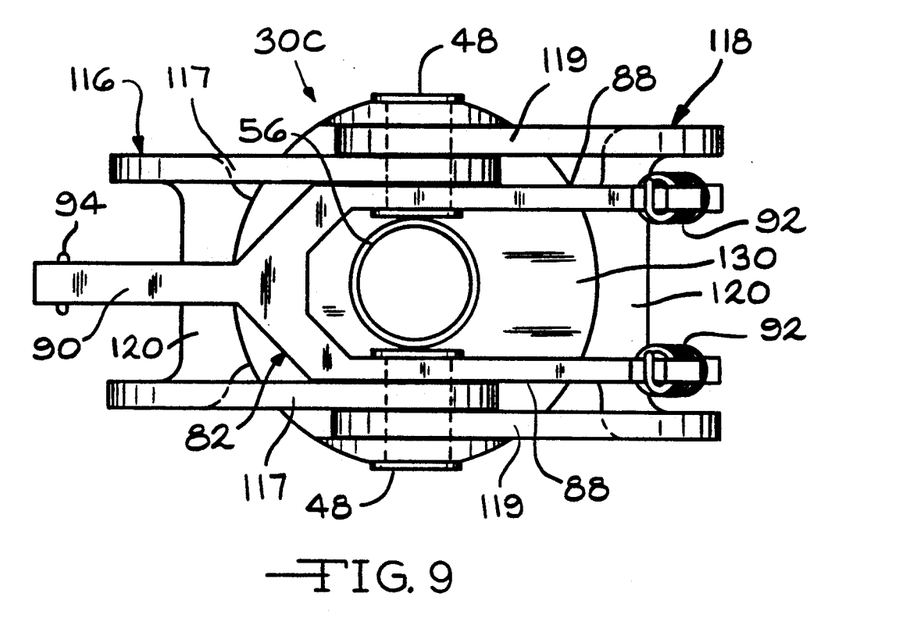
FIG. 9 is a plan view of the mechanism shown in FIGS. 7 and 8.
Figure 10:
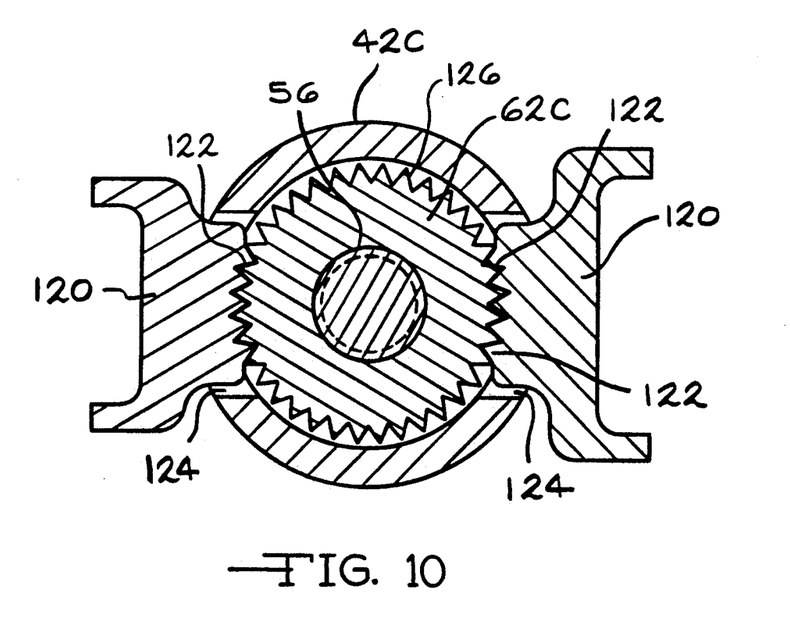
FIG. 10 is a sectional view as seen from substantially the line 10—10 of FIG. 7.

The secondary locking mechanism includes a pair of lock levers 116 and 118 rotatably mounted to the mounting flanges 46 at the pivot joint 48. The locking levers 116 and 118 are forked so as to be positioned on both sides of the shaft 56 as shown in FIG. 9. The locking levers 116 and 118 are generally C-shaped and are mounted at their upper ends at the pivot joint 48. The lower ends of the locking levers form pawl portions 120 having a plurality of teeth 122. The housing 42c includes openings 124 on opposite sides adjacent to the annular element 62c. The pawl portions 120 of the two locking levers extend through the openings 124.

Figure 7:
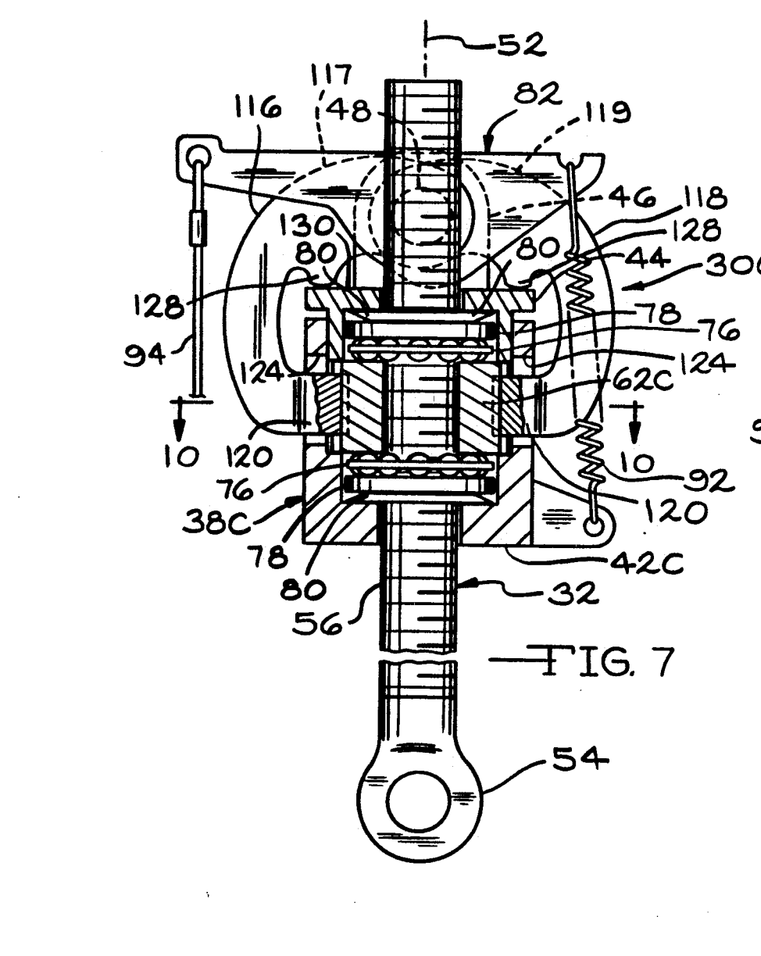
FIG. 7 is a sectional view of an alternative embodiment of the actuator with a secondary locking latch shown with the mechanism shown in a locked position.

The annular element 62c is provided with axially extending teeth 126 about its periphery which are engagable with the teeth 122 of the locking levers. The forked arms 117 and 119 on the locking levers each include a downwardly projecting cam portion 128 which rests upon the top surface 130 of the end cap 44. When the end cap is in the locked position as shown in FIG. 7, the end cap 44 is pushed away from the pivot joint 48 a sufficient distance that the two locking levers, due to gravitational forces, are rotated to a position in which the teeth 122 of the locking levers engage the teeth 126 of the annular element 62c, thus preventing rotation of the annular element.

Figure 8:
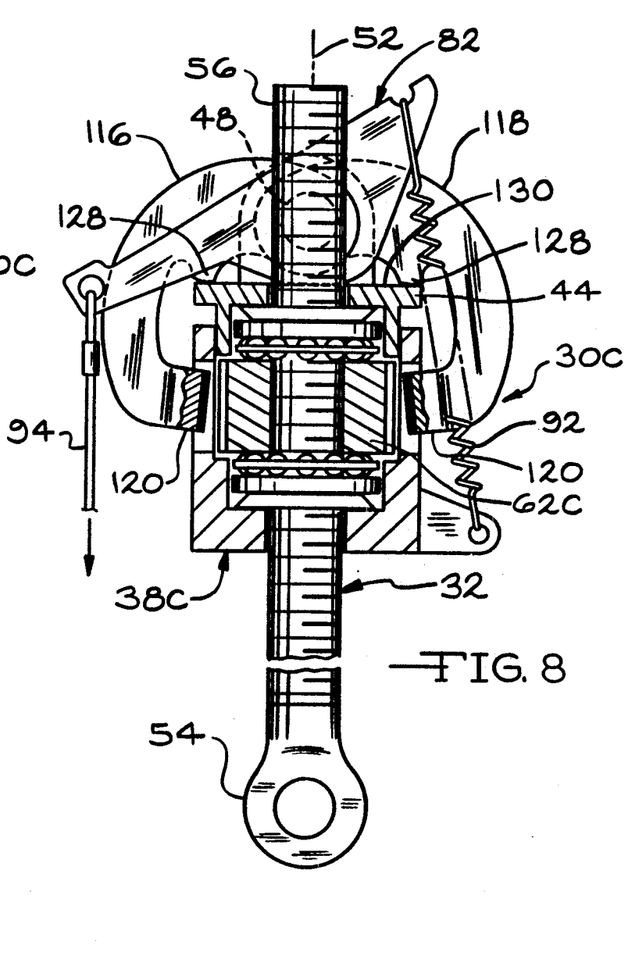
FIG. 8 is a sectional view of the mechanism of FIG. 7 shown in a released position.

When the end cap 44 is moved to an unlocked position as shown in FIG. 8 upon rotation of the cam lever 82, the top surface 130 of the end cap 44 exerts an upward force on the locking levers at the cam portions 128. Due to the horizontal offset between the cam portions 128 and the pivot joint 48, this upward force causes a rotation of the locking levers 116 and 118 about the pivot joint 48, withdrawing the pawl portions 120 of the locking levers from the annular element 62c and out of engagement with the teeth 126 of the annular element 62c. This frees the annular element 62c for rotation about the actuator axis 52 allowing the first part 32 of the actuator 30c to move relative to the second part 38c. Upon release of the pawl wire 94 and return of the cam lever 82 to the locked position, gravity will return the locking levers 116 and 118 to engagement with the annular element 62c.

Figure 11:
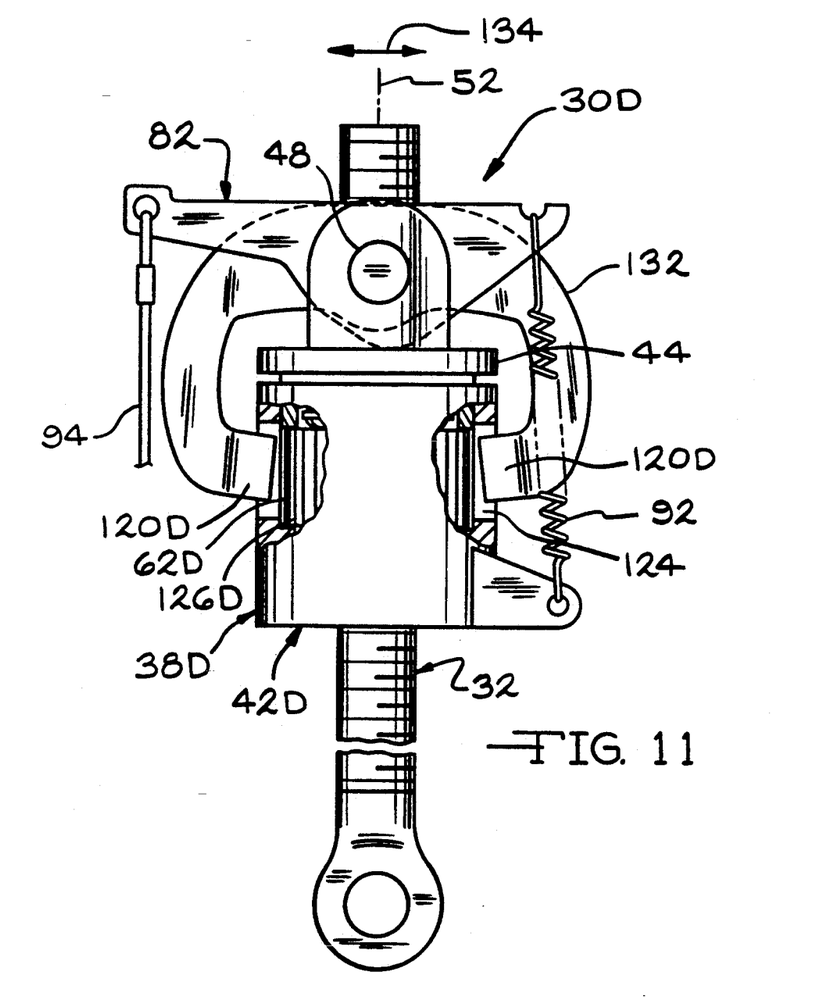
FIG. 11 is another embodiment of the actuator mechanism including a secondary inertia locking feature.

A last embodiment of the actuator 30 is shown in FIG. 11 designated generally as 30d. Like actuator 30c, actuator 30d is intended for use with the central axis 52 oriented vertically. Actuator 30d includes a secondary locking mechanism having a single locking lever 132. Locking lever 132 is generally C-shaped but is mounted at its center for rotation at the pivot joint 48 and has two pawl portions 120d with teeth engagable with the teeth 126d of the annular element 62d. The locking lever 132 extends in opposite directions from the pivot joint 148 with the pawl portions 120d engagable on opposite sides of the annular element 62d.

In addition to being oriented vertically, the actuator 30d should also be oriented with the locking lever 132 extending in the direction of anticipated loading applied to the seat assembly into which the actuator 30d is installed. The anticipated loading direction is indicated by the arrow 134. When used as a seat assembly recliner, the loading direction will be in the fore and aft direction. Without any load being applied to the seat assembly, the locking lever 132 will be positioned with the two pawl portions 120d spaced from the annular element 62d. During loading in the direction of arrow 134, the inertia of the locking lever 132 will cause it to rotate in one direction or the other about the pivot joint 48. This will cause one of the two pawl portions 120d to move into the housing 42d where the teeth of the pawl portion will engage the teeth 126d of the annular element 62d. The engagement between the teeth of the pawl portion and the annular element will prevent rotation of the annular element.

Because the locking lever 132 is normally not in locking engagement with the annular element 62d, there is no need for the locking lever to rotate upon unlocking of the actuator 30d when the end cap 44 is raised to an unlocked position. Accordingly, there are no cam portions on the locking lever 132 similar to the cam portions 128 of the locking levers in the actuator 30c.

The seat assembly of the present invention includes a linear actuator used as either a recliner mechanism or a seat adjuster mechanism. The linear actuator operates by frictional engagement with a spin nut to prevent the spin nut from rotating along a lead screw to hold the seat components in their adjusted positions. By using frictional engagement to prevent rotation of the spin nut, the actuator is made to lock-up upon axial loading by increasing the frictional forces acting on the spin nut and thus increasing its resistance to rotation. By providing the actuator with a cam action release lever, the actuator can be released with the use of a simple pull cable in a manner well know in manually adjustable seat assemblies.

It is to be understood that the invention is not limited to the exact construction illustrated and described above, but that various changes and modifications may be made without departing from the spirit and scope of the invention as defined in the following claims.

We claim:

1. An actuator for a motor vehicle seat assembly, said seat assembly having a base member for attachment to a motor vehicle, a seat member mounted to said base member for translational movement relative to said base member and a back member mounted to said seat member for rotation relative to said seat member, said actuator holding one of said seat member or back member in position relative to said base member or said seat member respectively, said actuator comprising:

an elongated lead screw having a pair of ends and defining central linear axis of said actuator, said screw being attached to one of said base member, seat member and back member, said screw having a threaded portion comprising a plurality of threads which extend in a helical fashion around the outside of said screw;

a spin nut having a central bore with a complementary threaded portion, said nut being threadably coupled to said screw and being axially movable along said screw in response to rotation of said spin nut about said axis, and said nut having axial end walls disposed in planes at a right angle to said central axis;

a housing having two ends mounted to another of said base member, seat member and back member, and containing said spin nut therein, said housing having an end wall at one end with an inner face in confronting juxtaposition with one end wall of said nut and said housing being open at the other end;

an end cap slidably disposed in said housing open end having an inner face in confronting juxtaposition to the other end wall of said spin nut to axially capture said nut between said inner faces, said cap further having an outer face opposite said inner face, said end cap being axially slidable in said open end between a lock position in which said inner faces forcefully engage said end walls of said spin nut to prevent rotation of said spin nut about said central axis and a release position in which said inner faces do not engage said end wall thereby permitting said nut to rotate about said axis;

bearing means within said housing to promote free rotation of said nut with respect to said screw;

yieldable resilient means within said housing to urge said end cap to said release position and to urge said nut away from said inner faces whereby said nut is free to rotate;

a cam rotatably mounted to said housing having a cam surface engaging said outer face of said cap, said cam having a first position in which said cam holds said end cap in opposition to said yieldable resilient means in said lock position of said end cap and said cam having a second position in which said end cap is allowed to be moved to said release position by said yieldable resilient means;

bias means for urging said cam to said first position whereby said nut is frictionally held from rotation; and release means for rotating said cam in opposition to said bias means to said second position whereby said nut is permitted to rotate about said screw.

2. The seat assembly of claim 1 wherein said lead screw ends are each attached to said base member and said housing is attached to said seat member whereby said actuator is operable as a seat adjuster to position said seat member upon said base member.

3. The seat assembly of claim 1 further comprising:

first pivotal attaching means for pivotally attaching one end of said lead screw to one of said seat member and said back member and having a first pivot axis normal to said central axis; and second pivotal attaching means for pivotally attaching said housing to the other of said seat member and said back member and having a second pivot axis normal to said central axis whereby said actuator is operable to rotatably position said back member relative to said seat member.

4. The seat assembly of claim 3 wherein on end of said lead screw is pivotally attached to said back member and said housing is pivotally attached to said seat member whereby said actuator is operable to rotatably position said back member relative to said seat member.

5. The seat assembly of claim 4 wherein said central linear axis is oriented generally horizontal.

6. The seat assembly of claim 3 wherein one end of said lead screw is pivotally attached to said seat member and said housing is pivotally attached to said back member whereby said actuator is operable to rotatably position said back member relative to said seat member.

7. The seat assembly of claim 6 wherein said central linear axis is oriented generally vertical.

8. The seat assembly of claim 3 wherein said cam is rotatably attached to said housing by said second pivotal attachment means.

9. The seat assembly of claim 8 wherein said cam is a forked member having a base portion extending radially relative to said second pivot axis to one side of said actuator and a pair of spaced parallel legs extending in radially relative to said second pivot axis to the opposite side of said actuator from the base portion of said cam, said legs each having axially protruding cam portions with edge surfaces engaging said outer face of said end cap.

10. The seat assembly of claim 9 wherein said central axis extends between said spaced legs of said cam.

11. The seat assembly of claim 8 further comprising a pair of flanges extending axially from the open end of said housing, and said second pivotal attachment means being formed in said flanges to mount said housing through said flanges.

12. The seat assembly of claim 1 further comprising:
first pivotally attaching means for pivotally attaching a first end of said lead screw to said seat member with said lead screw extending generally vertically upwardly from said first end; and
a second pivotal attaching means for pivotally attaching said housing to said back member; and wherein:
said spin nut has a circular outer periphery;
said housing comprises a tubular body with a cylindrical side wall parallel to said central axis, said tubular body being open at an upper end and having an end wall at a lower end of said side wall, said end wall having an aperture for said lead screw to pass therethrough, and a pair of mounting flanges extending axially upward from said tubular body at the open upper end of said side wall, said flanges being diametrically opposite one another and said second pivotal attaching means connecting said flanges to said back member to pivotally attach said housing, said cylindrical side wall further having a pair of diametrically opposite side wall openings therein adjacent said spin nut in said housing; and
means pivotally mounted to said flanges at said second pivotal attaching means and movable through said side wall openings for engaging said spin nut to prevent said spin nut from rotating about said central axis.

13. The seat assembly of claim 12 said means for engaging said spin nut includes a pair of C-shaped locking arms having first ends pivotally mounted to said flanges by said second pivotal attaching means and second ends extending downwardly from said second pivotal attaching means and through said side wall openings for engagement with said spin nut, said spin nut having a plurality of axially extending locking teeth about the periphery of spin nut and said second ends of said locking arms having complementary locking teeth for engagement with said spin nut locking teeth to prevent rotation of said spin nut.

14. The seat assembly of claim 13 wherein said locking arms are urged by gravity into engagement with said spin nut and further comprising cam portions extending downward from said locking arms for engagement with the outer surface of said end cap, said cam portions being spaced horizontally from said second pivotal attaching means whereby upon upward movement of said end cap to said release position said end cap applies a vertically upward force on said locking arms to rotate said locking arms out of engagement with said spin nut.

15. The seat assembly of claim 12 wherein said means for engaging said spin nut includes a single C-shaped lock lever mounted at its center to said flanges by said second pivotal attaching means, said lock lever having two end portions extending downwardly from said second pivotal attaching means and being balanced about said second pivotal attaching means to leave said end portions spaced from said spin nut during static conditions and said lock lever being rotatable by inertia forces to move one of said end portions into engagement with said spin nut, said end portions including axially extending locking teeth for engagement with said spin nut and said spin nut including complementary locking teeth about its periphery to prevent rotation of said spin nut when engaged by said lock lever.

16. In a seat assembly for a motor vehicle having a base member for attachment of said seat assembly to a motor vehicle, a seat member mounted to said base member for translational movement relative to said base member and a back member mounted to said seat member for rotational movement relative to said seat member, an actuator for holding two of said relatively movable members in position, said actuator comprising first and second portions mounted to opposite members of said relatively movable members, an annular element defining an axis and being disposed in said second portion and having transverse end faces at opposite axial ends thereof, means axially capturing said element on said second portion, said means axially capturing said element comprising capturing portions which are relatively adjustable to one condition permitting said element to rotate about said axis relative to said first and second portions of said actuator and to another condition preventing such rotation, said element and said first portion of said actuator comprising an operative connection between them which is effective, when said capturing portions are in said one condition and axial forces are concurrently applied to said actuator, to initiate rotation of said element about said axis relative to said first and second portions of said actuator, and said rotation of said element is in turn effective to permit translation of said first portion relative to both said element and said second portion thereby to change the relative positions of said relatively movable members, said capturing portions being disposed in confronting juxtaposition to said end faces of said element and operable in said another condition to apply axial capturing frictional forces against both said end faces great enough to prevent said element from rotating with respect to said first and second portions of said actuator in response to axially applied forces, bearing means and yieldable resilient means disposed in said second portion, said bearing means being urged by said yieldable resilient means to provide bearing support to promote free rotation of said element with respect to said first and second portions when said capturing portions are in said one condition, said yieldable resilient means yielding when said capturing portions are in said another condition so as to allow said capturing portions to apply said axial capturing forces against said end faces to prevent said element from rotating with respect to said first and second portions;

said capturing portions including a housing forming a recess within which said element is disposed and a housing cap covering said recess and being axially slidable relative to said housing, said cap having a first side being disposed in confronting juxtaposition to one end face of said element to apply said capturing frictional forces thereto and a second side opposite said first side and axially spaced therefrom, a cam mounted to said housing having a cam surface engaging said second side of said cap and said cam being movable to apply varying axially forces to said cap second side to move said cap between a first position corresponding to said one condition of said capturing portions and a second position corresponding to said another condition of said capturing portions.

17. The seat assembly of claim 16 further comprising pivotal attaching means for pivotally attaching said second portion to one of said relatively movable members and said pivotal attaching means further attaching said cam to said second portion for rotation of said cam relative to said second portion.

* * * * *